(12) United States Patent
Li et al.

(10) Patent No.: US 12,317,025 B2
(45) Date of Patent: May 27, 2025

(54) EARPHONE

(71) Applicant: Honor Device Co., Ltd., Shenzhen (CN)

(72) Inventors: Chenlong Li, Shenzhen (CN); Chao Yao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 57 days.

(21) Appl. No.: 18/029,801

(22) PCT Filed: Apr. 7, 2022

(86) PCT No.: PCT/CN2022/085642
§ 371 (c)(1),
(2) Date: Mar. 31, 2023

(87) PCT Pub. No.: WO2022/214040
PCT Pub. Date: Oct. 13, 2022

(65) Prior Publication Data
US 2023/0370761 A1    Nov. 16, 2023

(30) Foreign Application Priority Data

Apr. 8, 2021 (CN) .......................... 202110379581.4
Jul. 30, 2021 (CN) .......................... 202110873176.8

(51) Int. Cl.
*H04R 1/10* (2006.01)
*G01L 1/14* (2006.01)
*H04R 9/06* (2006.01)

(52) U.S. Cl.
CPC ......... *H04R 1/1041* (2013.01); *H04R 1/1016* (2013.01); *G01L 1/14* (2013.01); *H04R 2430/01* (2013.01)

(58) Field of Classification Search
CPC ................ H04R 1/1041; H04R 1/1016; H04R 2430/01; G01L 1/14
(Continued)

(56) References Cited

U.S. PATENT DOCUMENTS 11,917,355 B2    2/2024  Harjee et al.
2018/0324519 A1  11/2018 Park et al.
(Continued)

FOREIGN PATENT DOCUMENTS

CN    108174319 A    6/2018
CN    207560279 U    6/2018
(Continued)

*Primary Examiner* — Ammar T Hamid
(74) *Attorney, Agent, or Firm* — Leydig, Voit & Mayer, Ltd.

(57) ABSTRACT

This application provides an earphone, which can resolve a problem that a strain sensing module in the earphone and for implementing function keys occupies a large space area, thereby implementing the function keys of the earphone through pressing in multiple directions and reducing an overall size of the earphone. The earphone includes a housing and a pressure-strain structure arranged in a cavity formed by the housing. Two end portions of the pressure-strain structure are both in stable contact with an inner wall of the housing. A strain sensor is arranged on the pressure-strain structure. In a case that the housing is squeezed, the pressure-strain structure generates strain, and the strain sensor is configured to sense the strain generated by the pressure-strain structure.

15 Claims, 8 Drawing Sheets

(58) Field of Classification Search
USPC .................................................. 381/74, 334
See application file for complete search history.

(56) References Cited

U.S. PATENT DOCUMENTS

| | | | |
|---|---|---|---|
| 2020/0092629 A1* | 3/2020 | Smith | .................... G01L 1/02 |
| 2020/0100013 A1 | 3/2020 | Harjee et al. | |
| 2024/0155281 A1 | 5/2024 | Harjee et al. | |

FOREIGN PATENT DOCUMENTS

| | | |
|---|---|---|
| CN | 209234032 U | 8/2019 |
| CN | 110456940 A | 11/2019 |
| CN | 210405432 U | 4/2020 |
| CN | 211557446 U | 9/2020 |
| CN | 211909128 U | 11/2020 |
| CN | 212340519 U | 1/2021 |
| CN | 112468922 A | 3/2021 |
| CN | 112492435 A | 3/2021 |
| CN | 212785783 U | 3/2021 |
| CN | 214851755 U | 11/2021 |
| KR | 1020210035246 A | 3/2021 |
| WO | 2020060725 A1 | 3/2020 |

\* cited by examiner (a)          (b)

(a) (b)

EARPHONE

CROSS-REFERENCE TO RELATED APPLICATIONS

This application is a national stage of International Application No. PCT/CN2022/085642, filed on Apr. 7, 2022, which claims priority to Chinese Patent Application No. 202110379581.4, filed on Apr. 8, 2021, and Chinese Patent Application No. 202110873176.8, filed on Jul. 30, 2021. The disclosures of the aforementioned applications are hereby incorporated by reference in their entireties.

TECHNICAL FIELD

This application relates to the technical field of electronic devices, and in particular, to an earphone.

BACKGROUND

Generally, for ease of operations by a user, function keys for triggering operations such as power-on, power-off, pausing, playing, and sound recording are arranged on an earphone. Taking a wireless earphone as an example, a solution currently used in the industry is to arrange a strain sensing module in a cavity formed by a housing of an earphone stem. The strain sensing module needs to be attached to an inner side of the housing of the earphone stem. To improve a sensing capability of the strain sensing module, a plane assisted positioning region is usually added to the housing of the earphone stem, or a quantity of strain detection units of the strain sensing module is increased, so that a space area occupied by the housing of the earphone stem is large, thereby limiting a shape and a space size of the earphone stem.

SUMMARY

Embodiments of this application provide an earphone, which can resolve a problem that a strain sensing module in the earphone and for implementing function keys occupies a large space area, thereby implementing the function keys of the earphone through pressing in multiple directions and reducing an overall size of the earphone.

To achieve the foregoing objective, the following technical solutions are used in this application:

The embodiments of this application provide an earphone. The earphone includes a housing. A pressure-strain structure is further arranged in a cavity formed by the housing. Two end portions of the pressure-strain structure are both in stable contact with an inner wall of the housing. A strain sensor is arranged on the pressure-strain structure. In a case that the housing is squeezed, the pressure-strain structure generates strain, and the strain sensor is configured to sense the strain generated by the pressure-strain structure.

It should be understood that the two end portions of the pressure-strain structure are both in stable contact with the inner wall of the housing, which allows the pressure-strain structure to generate strain when being subject to a squeeze force from the housing. The strain refers to relative deformation of the pressure-strain structure subject to the squeeze force from the housing. Exemplarily, in a case that a user squeezes regions of the housing that are in contact with two ends of the pressure-strain structure, the pressure-strain structure may generate linear strain when being subject to bidirectional squeeze forces from the housing. Specifically, an inner side surface of the pressure-strain structure (that is, a concave surface of the pressure-strain structure) undergoes compressive deformation to generate negative strain. An outer side surface of the pressure-strain structure (that is, a convex surface of the pressure-strain structure) undergoes stretch deformation to generate positive strain. The earphone may trigger, according to the strain generated by the pressure-strain structure, the earphone to perform corresponding operations (such as power on, power off, pausing, and playing).

In this way, for the earphone provided in the embodiments of this application, it is unnecessary to attach the strain sensing module to the housing, to arrange an assisted positioning pressing region on the housing, and to add a strain detection unit. It is only necessary to enable the two end portions of the pressure-strain structure to be in stable contact with the inner wall of the housing, so that the pressure-strain structure is adaptively arranged in a cavity space formed by the housing, and therefore, can make full use of the cavity space formed by the housing, thereby reducing a space area occupied by the housing of the earphone, and reducing the overall size of the earphone.

In a possible implementation, the strain sensor is arranged on a first surface of the pressure-strain structure (that is, the outer side surface of the pressure-strain structure) and/or a second surface of the pressure-strain structure (that is, the inner side surface of the pressure-strain structure). Exemplarily, that a user squeezes the regions of the housing that are in contact with the two ends of the pressure-strain structure is still used as an example. The strain sensor arranged on the outer side surface of the pressure-strain structure is configured to sense the positive strain generated on the outer side surface of the pressure-strain structure, and the strain sensor arranged on the inner side surface of the pressure-strain structure is configured to sense the negative strain generated on the inner side surface of the pressure-strain structure.

In a possible implementation, the pressure-strain structure includes a bottom plate and side plates connected to two side edges of the bottom plate. An angle is provided between the side plate and the bottom plate. An end portion of the side plate away from the bottom plate is in stable contact with the inner wall of the housing. The side plate and the bottom plate may be integrally formed, or may be connected to each other in a manner such as welding. In a case that regions of the housing that are in stable contact with the pressure-strain structure are squeezed, the pressure-strain structure is compressed as a whole, and the side plates on two sides of the pressure-strain structure are squeezed by the housing and then approach to each other, thereby driving an inner side surface of the bottom plate to undergo compressive deformation to generate negative strain, and driving an outer side surface of the bottom plate to undergo stretch deformation to generate positive strain.

In a possible implementation, the strain sensor is arranged on a first surface of the bottom plate (that is, the outer side surface of the bottom plate) and/or a second surface of the bottom plate (that is, the inner side surface of the bottom plate). It should be understood that the strain generated by the foregoing pressure-strain structure is mainly manifested on the bottom plate of the pressure-strain structure. Therefore, the strain sensor is arranged on the bottom plate, which can improve precision of strain sensing.

In a possible implementation, in a case that the regions of the housing that are in contact with the two ends of the pressure-strain structure, the strain sensor is configured to sense first strain generated by the pressure-strain structure.

In a possible implementation, a processor is arranged in the cavity formed by the housing, and the strain sensor is electrically connected to the processor through a measurement circuit. The measurement circuit is configured to output a first signal to the processor according to the first strain. The first signal is used to instruct the earphone to perform a first operation. The first operation includes one of power-on, power-off, pausing, playing, or sound recording. In this way, the user may implement a function such as one of power-on, power-off, pausing, playing, or sound recording by squeezing the regions of the housing that are in contact with the two ends of the pressure-strain structure.

In a possible implementation, in a case that regions of the housing that fail to be in contact with the pressure-strain structure are squeezed, the strain sensor is configured to sense second strain generated by the pressure-strain structure.

In a possible implementation, a processor is arranged in the cavity formed by the housing, and the strain sensor is electrically connected to the processor through a measurement circuit. The measurement circuit is configured to output a second signal to the processor according to the second strain. The second signal is used to instruct the earphone to perform a second operation. The second operation includes one of power-on, power-off, pausing, playing, or sound recording. In this way, the user may implement another function such as one of power-on, power-off, pausing, playing, or sound recording by squeezing regions of the housing that fail to be in contact with the two ends of the pressure-strain structure It should be noted that strain generated by the pressure-strain structure is different in a case that different regions of the housing are squeezed. Exemplarily, in a case that the user squeezes the regions of the housing that are in contact with the two ends of the pressure-strain structure, negative strain is generated on the inner side surface of the pressure-strain structure, and positive strain (that is, the first strain) is generated on the outer side surface of the pressure-strain structure. However, in a case that the user squeezes the regions of the housing that fail to be in contact with the two ends of the pressure-strain structure, positive strain is generated on the inner side surface of the pressure-strain structure, and negative strain (that is, the second strain) is generated on the outer side surface of the pressure-strain structure.

It can be seen that to squeeze the housing to make the pressure-strain structure generate strain, it may be unnecessary to squeeze the regions of the housing that are in contact with the pressure-strain structure. The pressure-strain structure may also generate strain in a case that the regions of the housing that fail to be in contact with the pressure-strain structure are squeezed, thereby enabling the function keys of the earphone to be implemented more flexibly.

In a possible implementation, the cavity formed by the housing may further include a printed circuit board. The processor is arranged on the printed circuit board. The strain sensor is electrically connected to the printed circuit board through a soft board, so that the strain sensor is electrically connected to the processor.

In a possible implementation, the housing includes a housing of an earphone head and a housing of an earphone stem. The pressure-strain structure is arranged in a cavity formed by the housing of the earphone stem, and the two end portions of the pressure-strain structure are in stable contact with an inner wall of the housing of the earphone stem. In this way, it is convenient for the user to perform an operation.

In a possible implementation, a planar positioning region is arranged at a position on an outer surface of the housing of the earphone stem close to a region of the housing of the earphone stem that is in contact with the pressure-strain structure. In this way, the user can quickly find positions at which a function key is squeezed.

In a possible implementation, the housing includes a housing of an earphone head. The pressure-strain structure is arranged in a cavity formed by the housing of the earphone head, and the two end portions of the pressure-strain structure are in stable contact with an inner wall of the housing of the earphone head. In this way, the earphone is smaller in size and more convenient for the user to carry.

In a possible implementation, a capacitance-assisted detection solution may be added to the pressure-strain structure, to assist in determining squeezing strength and directions based on changes in capacitances in different regions of the pressure-strain structure during squeezing.

Specifically, the first surface of the pressure-strain structure (for example, the outer side surface of the pressure-strain structure) includes a first region (for example, a region C) and a second region (for example, a region D). The first region and the second region are respectively close to the regions of the housing that are in contact with the two ends of the pressure-strain structure. A first capacitance detection contact piece (for example, a copper sheet network) is attached to the first region, and the first capacitance detection contact piece may be electrically connected to the processor through the soft board. And/or a second capacitance detection contact piece (for example, a copper sheet network) is attached to the second region, and the second capacitance detection contact piece may be electrically connected to the processor through the soft board.

In a case that the housing is squeezed, the first capacitance detection contact piece is configured to detect a capacitance generated in the first region and the second capacitance detection contact piece is configured to detect a capacitance generated in the second region. Exemplarily, in a case that the user squeezes the regions of the housing that are in contact with the pressure-strain structure, changes in the capacitances in the region C and the region D of the pressure-strain structure are significant because fingers approach to and touch the housing. In a case that the user squeezes the regions of the housing that fail to be in contact with the pressure-strain structure, changes in the capacitances in the region C and the region D are not significant because the fingers are away from the region C and the region D. In this way, the changes in the capacitances in the region C and the region D of the pressure-strain structure may assist in determining the squeezing strength and directions.

In a possible implementation, the first surface (for example, the outer side surface) of the pressure-strain structure further includes a third region. The third region (for example, a region B) is located between the first region and the second region. A third capacitance detection contact piece (for example, a copper sheet network) is attached to the third region. The third capacitance detection contact piece may be electrically connected to the processor through the soft board. In a case that the housing is squeezed, the third capacitance detection contact piece is configured to detect a capacitance generated in the third region. Exemplarily, in a case that the user squeezes the regions of the housing that are in contact with the pressure-strain structure, the changes in the capacitances in the region C and the region D of the pressure-strain structure are significant because the fingers approach to and touch the housing, while a change in the capacitance in the region B is relatively small. In a case that the user squeezes the regions of the housing that fail to be in contact with the pressure-strain structure, the changes in the capacitance in the region C and the region D is relatively small because the fingers are away from the region C and the region D, while the change in the capacitance in the region B is greater. In this way, the changes in the capacitances in the region C and the region D of the pressure-strain structure may further assist in determining the squeezing strength and directions, thereby improving accuracy of assisted determining.

In a possible implementation, a fourth region (for example, a region A) is located at a position on the second surface (for example, the inner side surface) of the pressure-strain structure opposite to the third region. A fourth capacitance detection contact piece (for example, a copper sheet network) is attached to the fourth region. The fourth capacitance detection contact piece may be electrically connected to the processor through the soft board. In a case that the housing is squeezed, the fourth capacitance detection contact piece is configured to detect a capacitance generated in the fourth region. Exemplarily, in a case that the user squeezes the regions of the housing that are in contact with the pressure-strain structure, a change in the region A is also relatively small because the fingers approach to and touch the housing. In a case that the user squeezes the regions of the housing that fail to be in contact with the pressure-strain structure, the change in the region A may be relatively greater. In this case, with reference to the region C and the region D, determining of the squeezing strength and directions is assisted, thereby improving the accuracy of the assisted determining.

In this way, capacitance detection can assist in determining the squeezing directions (that is, directions in which the strain is generated), and therefore, according to differences in the strain directions and differences in the capacitance changes caused by different squeezing directions, manners of squeezing the housing of the earphone in different directions may be configured as different key functions, thereby expanding the key functions and improving user experience.

In a possible implementation, the foregoing pressure-strain structure may be further configured to perform sliding detection. Specifically, in a case that sliding is performed along an outer wall of the housing, the first capacitance detection contact piece is further configured to detect the capacitance generated in the first region (for example, the region C). The second capacitance detection contact piece is further configured to detect the capacitance generated in the second region (for example, the region D). The third capacitance detection contact piece is further configured to detect the capacitance generated in the third region (for example, the region B). Exemplarily, in a case that a finger of a user slides in a direction sequentially passing through the region C, the region B, and the region D, the finger approaches the region C first, then the region B, and finally the region D. Therefore, times at which the capacitances in the region C, the region B, and the region D change are different. In this way, according to change features of the capacitances in the region B, the region C, and the region D and with reference to magnitude of the strain sensed by the strain sensor in the pressure-strain structure, a function (for example, volume adjustment) of the earphone may be set to be implemented in a case that sliding is performed along the surface of housing of the earphone.

DESCRIPTION OF EMBODIMENTS

Figure 1A:
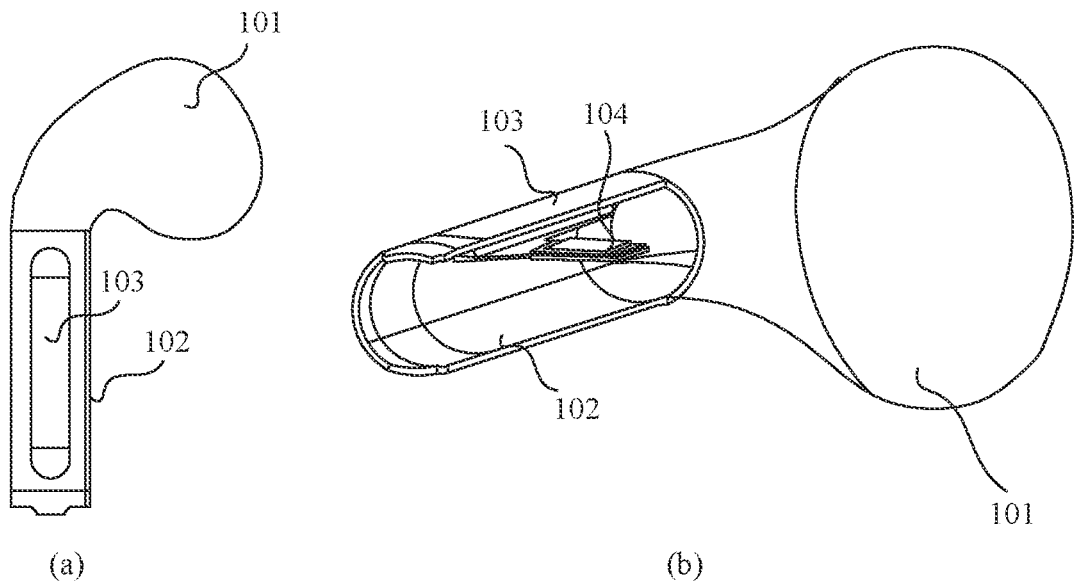
FIG. 1A is a schematic structural diagram of a wireless earphone in the prior art.

The following describes technical solutions in embodiments of this application with reference to accompanying drawings in the embodiments of this application. Apparently, the described embodiments are merely some rather than all of the embodiments of this application.

Terms such as "first" and "second" described below are used merely for description purposes, and shall not be understood as an indication or implication of relative importance or implicit indication of a quantity of indicated technical features. Therefore, a feature defined by "first" or "second" can explicitly or implicitly includes one or more of the features. In the description of this application, unless otherwise stated, "a plurality of" means two or more than two.

In the description of this application, orientation or position relationships indicated by the terms "center", "up", "down", "front", "back", "left", "right", "vertical", "horizontal", "top", "bottom", "inside", "outside", "lengthwise", and "crosswise", and the like are based on orientation or position relationships shown in the accompanying drawings, and are only for ease of describing this application and simplifying the description, rather than indicating or implying that the mentioned apparatus or component must have a specific orientation, be constructed and operated in a specific orientation. Therefore, such terms cannot be understood as a limitation to this application.

In this application, unless otherwise explicitly specified and defined, the term "connection" should be understood in its general senses. For example, the "connection" may be a fixed connection, a detachable connection, or an integrated connection; or may be a direct connection, or an indirect connection through an intermediate medium. In addition, the term "coupling" may be a manner of implementing electrical connection of signal transmission. A person of ordinary skill in the art can understand specific meanings of these terms in this application based on specific situations.

An earphone may be used in cooperation with an electronic device such as a mobile phone, a notebook computer or a watch, to process audio services such as media and calls of the electronic device, as well as some other data services. For example, the audio services may include media services such as playing music, recordings, sounds in video files, background music in games, and incoming call prompts for users, and may further include playing voice data from peer ends for the users, or collecting voice data of the users and sending the voice data to the peer ends in call service scenarios such as phone calls, WeChat voice messages, audio calls, video calls, games, and voice assistants.

Generally, for ease of operations by a user, function keys are arranged on an earphone. For example, for a wired earphone, function keys on an earphone cable may be configured to pause or resume music playing, and may further be configured to answer or hang up a phone call. For a wireless earphone (such as a Bluetooth earphone), function keys on the wireless earphone may further be configured to control power-on or power-off of the wireless earphone in addition to pausing or resuming music playing and answering or hanging up a phone call.

The wireless earphone may be a true wireless stereo (TWS) earphone. The TWS earphone is usually implemented based on a Bluetooth chip. During use of the TWS earphone, an electronic device is connected to a main earphone, and then quickly connected to a secondary earphone through the main earphone in a wireless manner, thereby enabling left and right Bluetooth channels to be truly used in a wireless and separated manner.

FIG. 1A is a schematic structural diagram of a TWS earphone 100 in the prior art. Referring to (a) in FIG. 1A and (b) in FIG. 1A, the TWS earphone 100 includes an earphone head 101 (also referred to as an earplug) and an earphone stem 102 connected to the earphone head 101. An audio module is arranged in a cavity formed by a housing of the earphone head 101, and may be configured to manage audio data, to enable the earphone to input and output audio signals, which allows a user to receive or answer a phone call, play music, and the like through the wireless earphone. A strain sensing module 104 is arranged in a cavity formed by a housing of the earphone stem 102. The strain sensing module 104 usually implements strain sensing in a pressing detection manner of directly contacting and pinching a resistance bridge that generates strain. Therefore, the strain sensing module 104 needs to be attached to the housing of the earphone stem 102. To enable the strain sensing module 104 to be attached to the housing, so that the strain sensing module 104 can sense accurately in a case that the user presses the housing of the earphone stem 102, the following two processing manners are generally used:

In the first manner, as shown in (a) in FIG. 1A and (b) in FIG. 1A, a planar pressing region 103 is arranged outside the housing of the earphone stem 102. The planar pressing region is used for assisted positioning in a case that the user presses the strain sensing module 104. In this case, a planar region needs to be designed on the housing of the earphone stem 102, to limit a shape of the earphone stem 102.

Figure 1B:
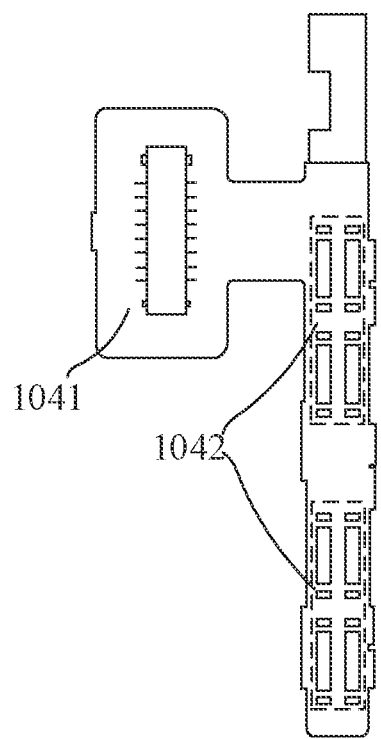
FIG. 1B is a schematic structural diagram of a strain sensing module in an earphone in the prior art.

In the second manner, in a case that there is no planer pressing region for assisted positioning to be arranged outside the housing of the earphone stem 102, a strain sensing region needs to be added to the strain sensing module 103. As shown in FIG. 1B, the strain sensing module 104 includes a connector 1041 coupled to a processor, and at least two groups of strain detection units 1042 (the figure shows two groups of strain detection units, and there may be three or even more groups of strain detection units to be arranged), to increase the strain sensing region. In this case, in a case that a quantity of the strain detection units in the strain sensing module 104 increases, a length of the strain sensing module 104 increases, which not only increase manufacturing costs of the strain sensing module 104, but also increases an internal space occupied by the strain sensing module 104 in the cavity formed by the housing of the earphone stem 102, thereby causing the housing of the earphone stem to be relatively long, and a space occupied by the housing of the earphone to be large.

It can be seen that manners for implementing the function keys of the earphone in the prior art may cause the housing of the earphone to include a plane assisted positioning region, or may cause a space area occupied by the housing of the earphone to be large. Consequently, a shape and a space size of the housing of the earphone are limited. In addition, in the prior art, the function keys of the earphone are implemented in the pressing detection manner of directly contacting and pinching a resistance bridge that generates strain, that is, implemented by enabling the strain sensing module 104 to sense a pressing action. A pressing force is mainly transferred from a region of the housing of the earphone stem 102 that is attached to the strain sensing module 104. Therefore, the strain sensing module 104 can only sense a single pressing action, and functions that can be implemented with the keys are excessively monotonous.

Furthermore, because the space area occupied by the housing of the earphone in the prior art is relatively large, which may be inconvenient for the user to carry or put on the earphone. Moreover, the function keys of the earphone in the prior art can only sense single pressing actions only in a case that the user presses specific positions of the earphone, which is inconvenient for the user to operate, and causes the user experience to be poor.

To resolve the foregoing problem, the embodiments of this application provide an earphone. The earphone may implement corresponding functions of function keys through pressing in multiple directions, which can reduce a space occupied by a housing of an earphone stem, thereby reducing an overall size of the earphone. The earphone provided in the embodiments of this application is described in detail below by taking a wireless earphone as an example. Pressing in multiple directions means that a user may squeeze a housing of the earphone in two opposite directions, for example, the user uses two fingers to pinch the housing of the earphone. Pressing in multiple directions may also mean that the user pinches different positions of the housing of the earphone in different directions, for example, the user uses two fingers to pinch any position of the earphone.

Figure 2:
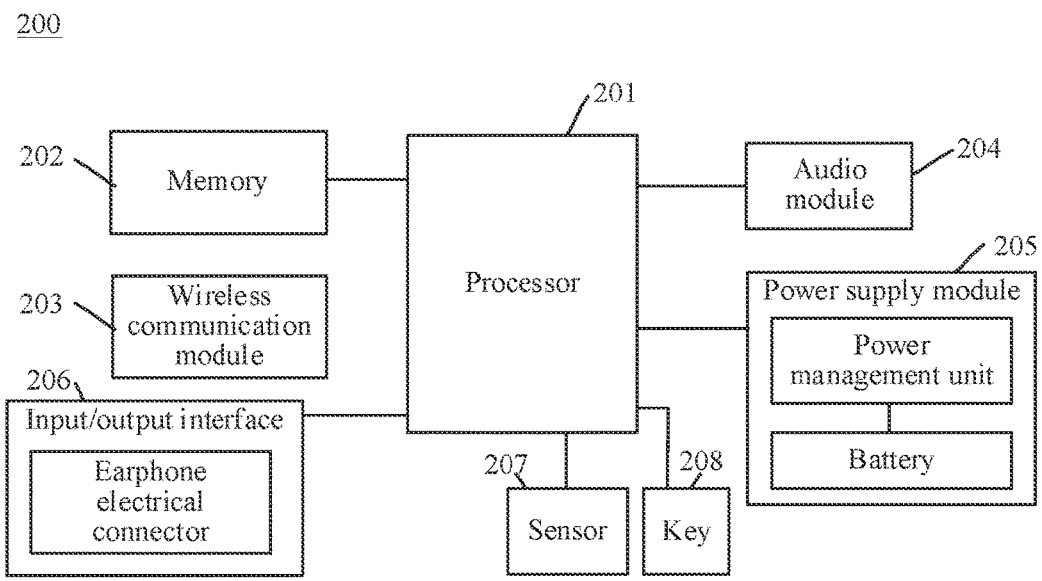
FIG. 2 is a schematic architectural diagram of a wireless earphone according to an embodiment of this application.

Exemplarily, FIG. 2 is a schematic architectural diagram of a wireless earphone 200 according to an embodiment of this application. The wireless earphone 200 may include at least one processor 201, at least one memory 202, a wireless communication module 203, an audio module 204, a power supply module 205, an input/output interface 206, and the like. the processor 201 may include one or more interfaces for the processor to connect to another component of the wireless earphone 200.

The memory 202 may be configured to store program code, such as program code for charging the wireless earphone 200, program code for the wireless earphone 200 to be paired with and connected to another electronic device in a wireless manner, or program code for the wireless earphone 200 to communicate with an electronic device in a wireless manner. The memory may further be configured to record a posture and a habit (such as pressing strength on a function key of the earphone) of a user, to implement triggering of operations such as power-on, power-off, pausing, playing, sound recording, starting charging, and stooping charging through keys.

The processor 201 may be configured to execute the foregoing application program code, and invoke related modules to implement functions of the wireless earphone 200 in this embodiment of this application, such as a charging function, a wireless communication function, and an audio data playing function of the wireless earphone 200. The processor 201 may include one or more processing units. Different processing units may be independent components, or may be integrated into one or more processors 201. The processor 201 may specifically be an integrated control chip, or may be formed by a circuit including various active and/or passive components, and the circuit is configured to perform the functions of the processor 201 described in this embodiment of this application.

The wireless communication module 203 may be configured to support data exchange of wireless communication including Bluetooth (BT), a global navigation satellite system (GNSS), a wireless local area network (WLAN) (for example, a wireless fidelity (Wi-Fi) network), frequency modulation (FM), a near field communication (NFC) technology, an infrared (IR) technology, and the like between the wireless earphone 200 and another electronic device or earphone box. In some embodiments, the wireless communication module 203 may be a Bluetooth chip. The wireless earphone 200 may pair with and establish a wireless connection to a Bluetooth chip of another electronic device through the Bluetooth chip, to implement wireless communication between the wireless earphone 200 and another electronic device through the wireless connection.

In addition, the wireless communication module 203 may further include an antenna. The wireless communication module 203 receives an electromagnetic wave through the antenna, performs frequency modulation and filtering processing on an electromagnetic wave signal, and sends the processed signal to the processor 201. The wireless communication module 203 may further receive a to-be-sent signal from the processor 201, perform frequency modulation and amplification on the to-be-sent signal, and convert the signal into an electromagnetic wave for radiation through the antenna.

The audio module 204 may be configured to process audio data, to enable the wireless earphone 200 to input and output audio signals. For example, the audio module 204 may obtain an audio signal from the wireless communication module 203, or transmit an audio signal to the wireless communication module 203, to implement functions such as answering or making a phone call, playing music, activating/deactivating a voice assistant of an electronic device connected to the earphone through the wireless earphone, and receiving/sending voice data of the user. The audio module 204 may include a speaker (or referred to as an earpiece or a receiver) assembly for outputting an audio signal, a microphone (or referred to as a voice tube or a mike), a microphone sound-receiving circuit matched with the microphone, and the like. The speaker may be configured to convert an audio electrical signal into a sound signal and play the sound signal. The microphone may be configured to convert a sound signal into an audio electrical signal. It should be understood that the foregoing audio module 204 may be arranged independently outside the processor 201 for implementation, or may be integrated inside the processor 201 for implementation.

The power supply module 205 may supply power to each module of the wireless earphone 200, support the wireless earphone 200 to receive a charging input, and the like. The power supply module 205 may include a power management unit (PMU) and a battery. The power management unit may include a charging circuit, a voltage drop regulation circuit, a protection circuit, a power measurement circuit, and the like. The charging circuit may receive an external charging input. The voltage drop regulation circuit may perform voltage transformation on an electrical signal inputted by the charging circuit and then output the electrical signal to the battery, to complete charging of the battery, or may perform voltage transformation on an electrical signal inputted by the battery and then output the electrical signal to another module such as the audio module 204 or the wireless communication module 203. The protection circuit may be configured to prevent the battery from overcharge, overdischarge, short circuit, over-current, or the like. In some embodiments, the power supply module 205 may further include a wireless charging coil for charging the wireless earphone 200 in a wireless manner. In addition, the power management unit may be further configured to monitor parameters such as a battery capacity, a batter cycle count, and a battery health state (leakage or impedance).

A plurality of the input/output interfaces 206 may be configured to provide a wired connection for charging or communication between the wireless earphone 200 and an earphone box. In some embodiments, the input/output interface 206 may include an earphone electrical connector for conducting and transmitting an electric current. In a case that the wireless earphone 200 is placed in the earphone box, the wireless earphone 200 may establish an electrical connection to an electrical connector in the earphone box through the earphone electrical connector (for example, the earphone electrical connector directly contacts the electrical connector in the earphone box). After the electrical connection is established, the earphone box can charge the battery in the wireless earphone 200 through current transmission functions of the earphone electrical connector and the electrical connector in the earphone box. For example, the earphone electrical connector can be a pogo pin, a spring needle, an elastic piece, a conductive block, a conductive patch, a conductive piece, a pin, a plug, a contact pad, a jack, a socket, or the like. A specific type of the electrical connector is not limited in this embodiment of this application.

Specifically, the wireless earphone 200 may include a pair of earphone bodies used in cooperation with left and right ears of the user. Each of the earphone bodies may include two earphone electrical connectors. In a case that the earphone body is placed in the earphone box, the earphone body may establish an electrical connection to two corresponding electrical connectors arranged in the earphone box through the two earphone electrical connectors. After the electrical connection is established, the earphone box may charge the battery in the earphone body.

In some other embodiments, after the electrical connection is established, data communication may further be performed between the wireless earphone 200 and the earphone box, for example, the wireless earphone may receive a pairing instruction from the earphone box.

In addition, the wireless earphone 200 may further include a sensor 207. For example, the sensor 207 may be a distance sensor or an optical proximity sensor, and may be configured to determine whether the wireless earphone 200 is put on by the user. Exemplarily, the wireless earphone 200 may use the distance sensor to detect whether there is an object near the wireless earphone 200, to determine whether the wireless earphone 200 is put on by the user. In a case that the wireless earphone 200 is determined to be put on, the wireless earphone 200 may turn on the speaker. In some embodiments, the wireless earphone 200 may further include a bone conduction sensor, to form a bone conduction earphone. By using the bone conduction sensor, the wireless earphone 200 may acquire a vibration signal from a vibration bone of a vocal-cord part, and parse out a voice signal, to implement a voice function.

For another example, an outer surface of the wireless earphone 200 may further include: a touch sensor, configured to detect a touch operation by a user; a fingerprint sensor, configured to detect a fingerprint of the user and identify an identity of the user; and some other sensors such as a capacitance sensor configured to detect a change in a capacitance and adaptively adjust some parameters (for example, volume).

It may be understood that the structure illustrated in this embodiment of this application does not constitute a specific limitation on the wireless earphone 200. The wireless earphone may include more or fewer components than those shown in FIG. 2, or combine two or more components, or have a different component configuration. For example, the outer surface of the wireless earphone 200 may further include components such as a key 208, an indicator light (which may indicate states such as a battery level, an incoming/outgoing call, or a pairing mode), a display (which may prompt the user with related information), and a dust-proof screen (which may be used in cooperation with the earpiece). The key 208 may be a physical key or a touch key (used in cooperation with the touch sensor), or the like, and is configured to trigger operations such as power-on, power-off, pausing, playing, sound recording, starting charging and stopping charging.

The components shown in FIG. 2 may be implemented by hardware that includes one or more signal processors or application-specific integrated circuits, software, or a combination of hardware and software.

Figure 3:
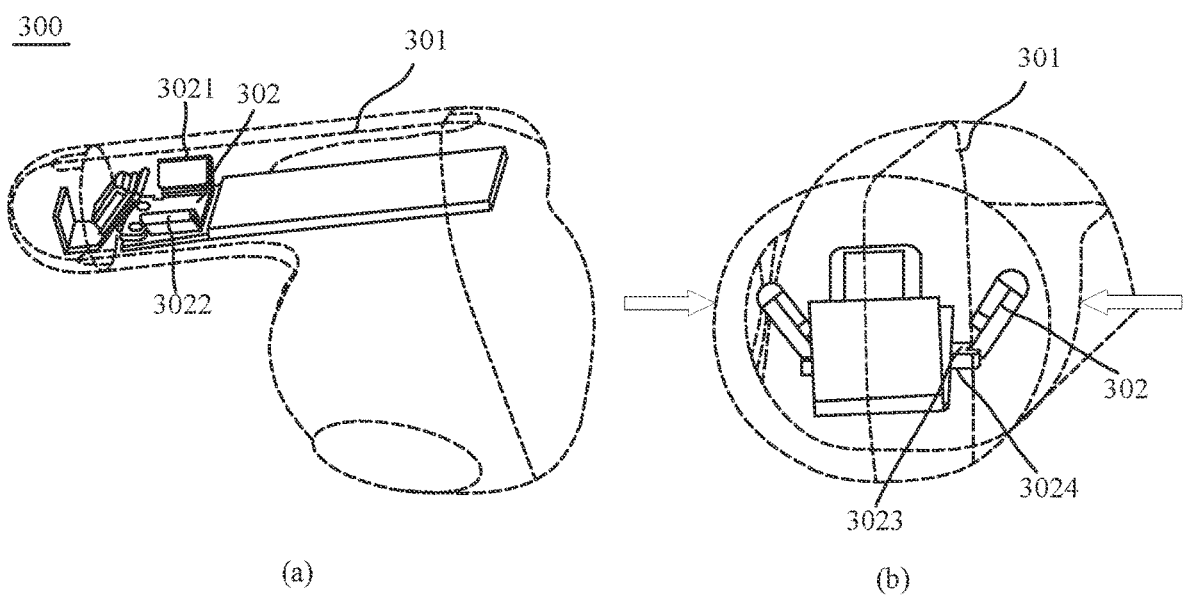
FIG. 3 is a schematic structural diagram of an earphone body according to an embodiment of this application.

To implement the function keys of the earphone through pressing in multiple directions, the earphone provided in this embodiment of this application includes earphone bodies. Exemplarily, FIG. 3 is a schematic structural diagram of an earphone body 300 according to an embodiment of this application. The earphone body 300 includes a housing 301 and internal components. The internal components are arranged in a cavity formed by the housing 301. The internal components may include devices in modules such as the processor 201, the wireless communication module 203, the audio module 204, and the power supply module 205 in the foregoing wireless earphone shown in FIG. 2.

A pressure-strain structure 302 is further arranged in the cavity formed by the housing 301. Two end portions (for example, a first end 3021 and a second end 3022 shown in (a) in FIG. 3) of the pressure-strain structure 302 are in stable contact with an inner wall of the housing 301 in an elastic contact manner, a welding contact manner, or the like, which is not specifically limited in this embodiment of this application. In a case that a user squeezes the housing in two directions (that is, the user pinches the housing with two fingers), the pressure-strain structure 302 generates strain when being subject to a squeeze force from the housing 301. The strain refers to relative deformation of the pressure-strain structure 302 subject to the squeeze force from the housing 301. The earphone body 300 shown in FIG. 3 is used as an example. In a case that a user squeezes regions of the housing 301 that are in contact with two ends of the pressure-strain structure 302 (that is, the user squeezes in two directions indicated by arrows shown in (b) in FIG. 3), the pressure-strain structure 302 may generate linear strain when being subject to bidirectional squeeze forces from the housing 301. In this case, an inner side surface 3023 of the pressure-strain structure 302 undergoes compressive deformation to generate negative strain, and an outer side surface 3024 of the pressure-strain structure 302 undergoes stretch deformation to generate positive strain.

Figure 4:
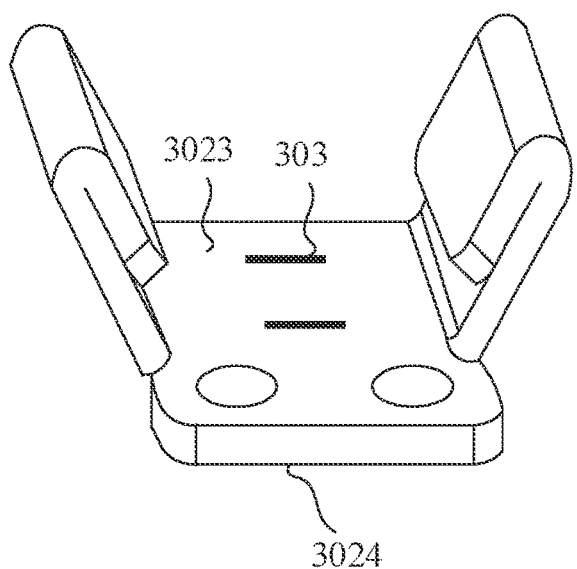
FIG. 4 is a schematic structural diagram 1 of an arrangement position of a strain sensor according to an embodiment of this application.

To sense the strain generated by the pressure-strain structure 302, as shown in FIG. 4, a strain sensor 303 is arranged on the pressure-strain structure 302. The strain sensor 303 may be electrically connected to a processor of the earphone, to send magnitude of the strain generated by the pressure-strain structure 302 to the processor, so that the processor triggers the earphone to perform operations such as power-on, power-off, pausing, playing, and sound recording according to the magnitude of the strain generated by the pressure-strain structure 302. In a case that the user squeezes the housing 301, the strain sensor 303 is configured to sense the strain generated by the pressure-strain structure 302, so that the processor performs a corresponding functional operation (such as pausing or playing) according to the strain sensed by the strain sensor 303.

The foregoing strain sensor 303 may be a resistance strain gauge, and the resistance strain gauge may convert a change in strain on a mechanical component into a change in resistance. The resistance strain gauge includes a sensitive grid resistance element and a lead. The sensitive grid resistance element may be made of a filament being defined with a diameter of 0.01 mm to 0.05 mm, having a high resistance coefficient, and bent into a grid shape, and is used as a sensitive part of a sensing mechanical component of the resistance strain gauge. The lead may be made of a metal wire such as a copper wire, and is electrically connected to the sensitive grid resistance element, to connect the sensitive grid resistance element to a measurement circuit.

During mounting, the resistance strain gauge needs to be adhered to a surface of the pressure-strain structure 302 by using an adhesive. In a case that the pressure-strain structure 302 is subject to a squeeze force from the housing 301, the pressure-strain structure 302 generates strain. In a case that the pressure-strain structure 302 generates strain, the sensitive grid resistance element in the resistance strain gauge also generates strain, causing a resistance value of the sensitive grid resistance element to be changed. By measuring a change in the resistance of the resistance strain gauge by the measurement circuit, it can be learned whether the pressure-strain structure 302 is squeezed.

It should be understood that the strain sensor 303 is attached to the surface of the pressure-strain structure 302, and the strain sensor 303 may be coupled to the processor through a soft board, that is, a flexible printed circuit (FPC). A measurement circuit for measuring a change in a resistance value of the strain sensor 303 may be arranged on the FPC.

In this way, in the earphone in this embodiment of this application, it is unnecessary to attach the strain sensing module (that is, the pressure-strain structure 302 and the strain sensor 303 shown in FIG. 3) to the housing, to arrange an assisted positioning pressing region on the housing 301 of the earphone body 300, and to add a plurality of groups of strain detection units. It is only necessary to enable the two end portions of the pressure-strain structure 302 to be in stable contact with the inner wall of the housing 301. In this way, in a case that the housing is squeezed in two directions, the pressure-strain structure 302 generates strain, and the strain generated by the pressure-strain structure 302 can be sensed by the strain sensor 303, thereby implementing a corresponding function (such as pausing or playing) of a function key of the earphone. By arranging the pressure-strain structure 302 in the cavity formed by the housing 301 of the earphone body 300 in this embodiment of this application, the pressure-strain structure 302 may be adaptively arranged in a cavity space formed by the housing 301, so that the cavity space formed by the housing 301 can be fully used, thereby reducing a space area occupied by the housing of the earphone and reducing an overall size of the earphone.

Figure 5:
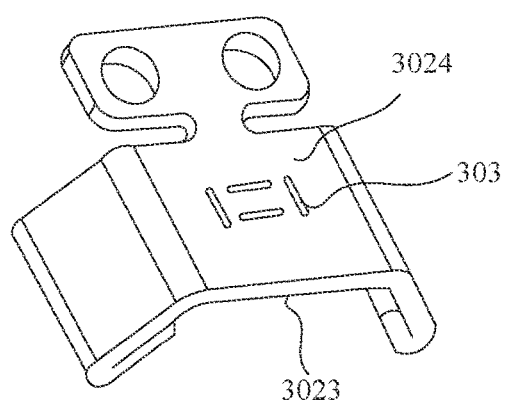
FIG. 5 is a schematic structural diagram 2 of an arrangement position of a strain sensor according to an embodiment of this application.
Figure 5:
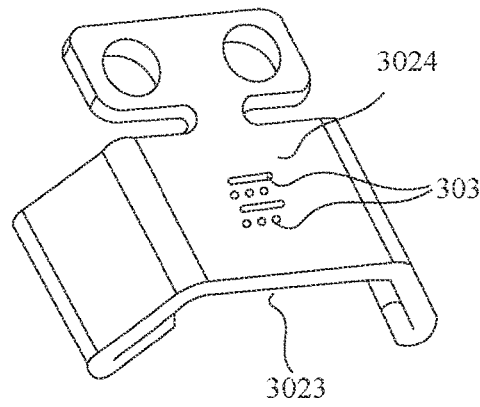

It should be understood that the foregoing strain sensor 303 may be arranged on the inner side surface 3023 of the pressure-strain structure 302, as shown in FIG. 4. The foregoing strain sensor 303 may alternatively be arranged on the outer side surface 3024 of the pressure-strain structure 302, as shown in (a) in FIG. 5. Both the inner side surface 3023 and the outer side surface 3024 of the pressure-strain structure 302 may be arranged with the strain sensors 303, as shown in (b) in FIG. 5 (where three circles in the figure represent the strain sensors 303 arranged on the inner side surface 3023).

In a case that both the inner side surface 3023 and the outer side surface 3024 of the pressure-strain structure 302 are arranged with the strain sensors 303, the strain sensors 303 detect the strain generated by the pressure-strain structure 302 in a differential detection manner. That is, the strain generated by the pressure-strain structure 302 and received by the processor is a differential value between a strain value sensed by the strain sensor 303 on the inner side surface 3023 of the pressure-strain structure 302 and a strain value sensed by the strain sensor 303 on the outer side surface 3024. In this way, detection accuracy can be improved.

Exemplarily, in a case that the regions of the housing 301 that are in contact with the pressure-strain structure 302 are squeezed in directions shown in (b) in FIG. 3, the pressure-strain structure 302 is subject to the squeeze force from the housing 301 and generates the strain. In this case, the strain sensor 303 mounted on the inner side surface 3023 of the pressure-strain structure 302 may be configured to sense the negative strain generated on the inner side surface 3024 of the pressure-strain structure 302. The strain sensor 303 mounted on the outer side surface 3024 of the pressure-strain structure 302 may be configured to sense the positive strain generated on the outer side surface 3024 of the pressure-strain structure 302. In this case, the foregoing measurement circuit may output an indication signal (that is, a first signal) to the processor according to the negative strain sensed by the strain sensor 303 mounted on the inner side surface 3023 of the pressure-strain structure 302, or the positive strain sensed by the strain sensor 303 mounted on the outer side surface 3024 of the pressure-strain structure 302, to instruct the earphone to perform operations such as power-on, power-off, pausing, playing, and sound recording. It should be understood that the indication signal is generally a voltage signal.

Figure 6:
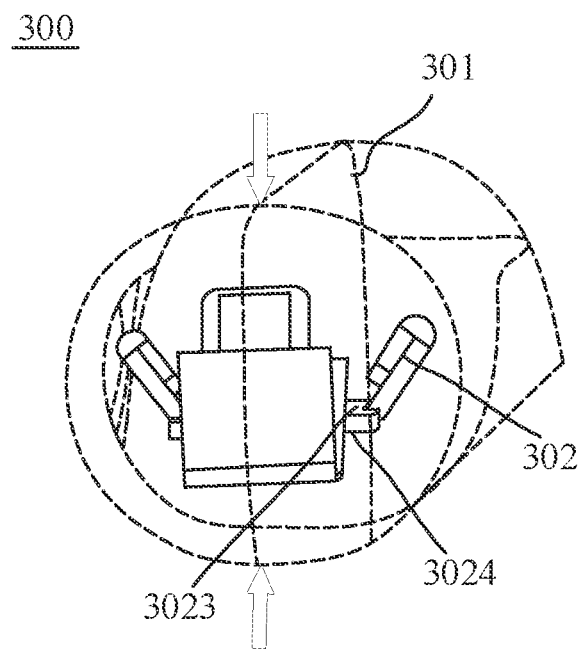
FIG. 6 is a schematic structural diagram of a squeezing scenario according to an embodiment of this application.

It should be further noted that, in the earphone body 300 shown in FIG. 3, in a case that a user squeezes regions of the housing 301 that fail to be in contact with the pressure-strain structure 302 (for example, the user squeezes in two directions indicated by arrows shown in FIG. 6), the pressure-strain structure 302 may also generate linear strain when being subject to the squeeze force from the housing 301. In this case, the inner side surface 3023 of the pressure-strain structure 302 undergoes stretch deformation to generate positive strain, and the outer side surface 3024 of the pressure-strain structure 302 undergoes compressive deformation to generate negative strain.

In this case, the strain sensor 303 mounted on the inner side surface 3023 of the pressure-strain structure 302 may be configured to sense the positive strain generated on the inner side surface 3024 of the pressure-strain structure 302. The strain sensor 303 mounted on the outer side surface 3024 of the pressure-strain structure 302 may be configured to sense the negative strain generated on the outer side surface 3024 of the pressure-strain structure 302. In this case, the foregoing measurement circuit may output an indication signal (that is, a second signal) to the processor according to the positive strain sensed by the strain sensor 303 mounted on the inner side surface 3023 of the pressure-strain structure 302, or the negative strain sensed by the strain sensor 303 mounted on the outer side surface 3024 of the pressure-strain structure 302, to instruct the earphone to perform operations such as power-on, power-off, pausing, playing, and sound recording. It should be understood that the indication signal is generally a voltage signal.

It can be seen that, to squeeze the housing 301 to make the pressure-strain structure 302 generate strain, it may be unnecessary to squeeze the regions of the housing 301 that are in contact with the pressure-strain structure 302. The pressure-strain structure 302 may also generate strain in a case that the regions of the housing 301 that fail to be in contact with the pressure-strain structure 302. That is, the user may use two fingers to pinch any position of the earphone (that is, pressing in multiple directions), to enable the function keys of the earphone to be implemented more flexibly. For example, one of the function keys of the earphone, such as pausing or playing music, may be implemented by squeezing the regions of the housing 301 that are in contact with the pressure-strain structure 302. Another function key of the earphone, such as power-on or power-off, may be implemented by squeezing the regions of the housing 301 that fail to be in contact with the pressure-strain structure 302.

It should be understood that the indication signal (for example, the first signal or the second signal) outputted by the strain sensor 303 to the processor through the measurement circuit is related to strength with which the user squeezes the housing, and the first signal and the second signal may be used to instruct the earphone to perform different operations. The earphone may be set according to a usage habit of the user. Therefore, functions corresponding to positions at which the user squeezes the housing are not specifically limited in this embodiment of this application.

Figure 7:
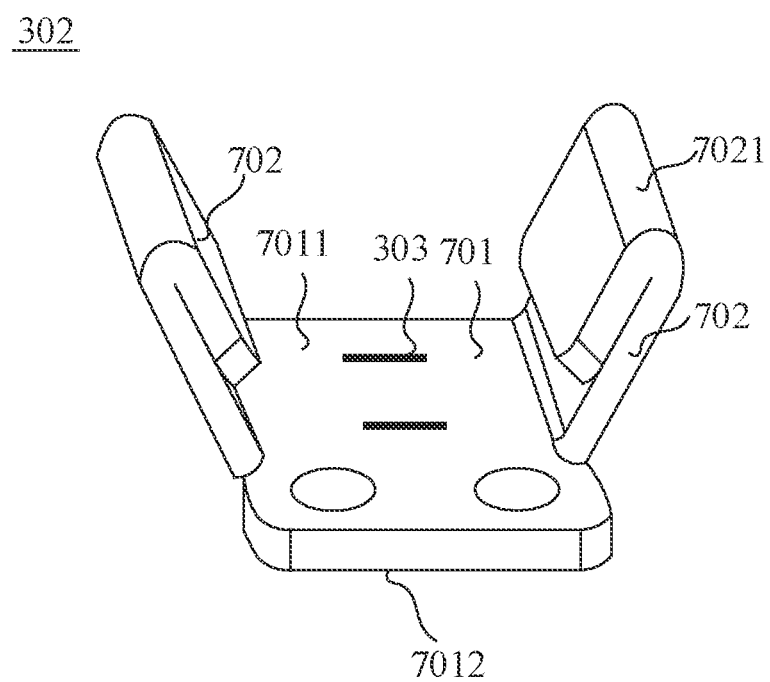
FIG. 7 is a schematic structural diagram of a pressure-strain structure according to an embodiment of this application.

FIG. 7 is a schematic structural diagram of a pressure-strain structure 302 in an earphone according to an embodiment of this application. Referring to FIG. 7, the pressure-strain structure 302 includes a bottom plate 701 and side plates 702 connected to two side edges of the bottom plate 701. An angle is provided between the side plate 702 and the bottom plate 701 to form a groove structure. The side plate 702 and the bottom plate 701 may be integrally formed, or may be connected to each other in a manner such as welding.

In a case that the pressure-strain structure 302 is arranged in the cavity formed by the housing 301 of the earphone shown in FIG. 3, an end portion 7021 of the side plate 702 away from the bottom plate 701 is in stable contact with the inner wall of the cavity formed by the housing 301 of the earphone.

In a case that regions of the housing 301 that are in contact with the pressure-strain structure 302 are squeezed (that is, in the directions indicated by the arrows shown in (b) in FIG. 3), the pressure-strain structure 302 is compressed as a whole, and the side plates 702 on two sides of the pressure-strain structure 302 are squeezed by the housing 301 and then approach to each other, thereby driving an inner side surface 7011 of the bottom plate 701 to undergo compressive deformation to generate negative strain, and driving an outer side surface 7012 of the bottom plate 701 to undergo stretch deformation to generate positive strain.

In a case that regions of the housing 301 that fail to be in contact with the pressure-strain structure 302 are squeezed (that is, in the directions indicated by the arrows shown in FIG. 6), the pressure-strain structure 302 is also stretched as a whole, and the side plates 702 on the two sides of the pressure-strain structure 302 are squeezed by the housing 301 and then away from each other, thereby driving the inner side surface 7011 of the bottom plate 701 to undergo stretch deformation to generate positive strain, and driving the outer side surface 7012 of the bottom plate 701 to undergo compressive deformation to generate negative strain.

It can be seen that directions of the strain generated by the pressure-strain structure 302 is related to regions at which the user squeezes the housing 301. In a case that the user squeezes the portions of the housing 301 of the earphone body that are in contact with the pressure-strain structure 302 or squeezes the regions of the housing of the earphone body that fail to be in contact with the pressure-strain structure, different directions of strain may be generated. Therefore, the foregoing earphone body 300 may set different functions for the function keys according to different squeezing directions.

It should be noted that the foregoing pressure-strain structure 302 is not limited to the groove-shaped structure shown in FIG. 7, but may alternatively be in any other shape with two end portions, such as an irregular groove structure or an arc-shaped groove structure. A material of the pressure-strain structure 302 may be SUS301 stainless steel, or may be another high-strength elastic material. This is not specifically limited in this embodiment of this application.

It should be further understood that, in the pressure-strain structure 302 shown in FIG. 7, the strain generated by the pressure-strain structure 302 is mainly manifested on the bottom plate 701, and therefore, the strain sensor 303 is arranged on the bottom plate 701, which can improve the precision of strain sensing. For example, the strain sensor 303 may be arranged on the inner side surface 7011 of the bottom plate 701, or may be arranged on the outer side surface 7012 of the bottom plate 701, or both the inner side surface 7011 and the outer side surface 7012 of the bottom plate 701 may be arranged with the strain sensors 303. This is not specifically limited in this embodiment of this application.

Figure 8A:
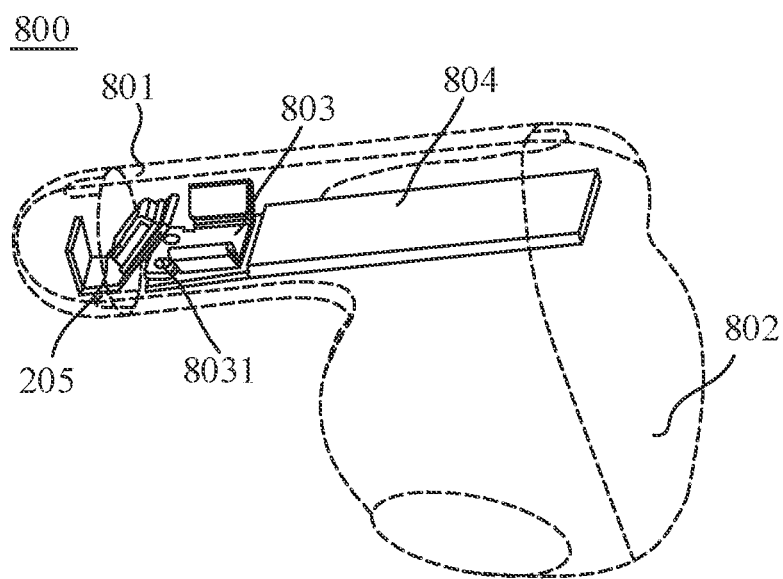
FIG. 8A is a schematic structural diagram of another earphone body according to an embodiment of this application.

FIG. 8A is a schematic structural diagram of an earphone body 800. The earphone body 800 may include an earphone stem 801 and an earphone head 802 connected to a top end of the earphone stem 801. Internal components such as a circuit board 804 may be arranged inside cavities formed by the earphone stem 801 and the earphone head 802. The circuit board 804 may be a printed circuit board (PCB). Various assemblies such as a processor, a memory, and a charging circuit may be arranged on the circuit board 804, to implement functions of the wireless communication module 203, the audio module 204, the power supply module 205, and the like shown in FIG. 2. For example, the power supply module 205 may be arranged inside the cavity formed by the earphone stem 801. A speaker assembly in the audio module 204 may be arranged inside the cavity formed by the earphone head 802. In a case that a user puts on the earphone, the user may hear a sound signal from the speaker assembly inside the cavity formed by the earphone head 802, to implement functions such as playing music and answering/making a phone call for the user.

In the earphone body 800 shown in FIG. 8A, a pressure-strain structure 803 is arranged inside the cavity formed by the earphone stem 801. The earphone stem 801 is generally configured for the user to hold the earphone body 800 and put on the earphone body to an earhole of the user. To enable the user to feel more comfortable and have a better sense of experience, the earphone stem 801 is generally designed as a smooth cylindrical rod structure. Considering the convenience for the user to squeeze a housing of the earphone stem 801 of the earphone to implement operations on function keys of the earphone, the pressure-strain structure 803 (that is, like the pressure-strain structure 302 shown in FIG. 7) may generally be arranged at the tail of the cavity formed by the earphone stem 801. Generally, the power supply module 205 of the earphone shown in FIG. 2 is arranged at a position, close to the tail of the earphone stem 801, in the cavity formed by the earphone stem 801. In this way, the power supply module 205 may be coupled to an earphone electrical connector configured to charge the earphone and arranged at the tail of the earphone stem 205, so that in a case that a wireless earphone is placed in an earphone box, the wireless earphone may be electrically connected to an electrical connector in the earphone box through the earphone electrical connector, to charge the wireless earphone. Therefore, the pressure-strain structure 803 may be arranged in the cavity formed by the earphone stem 801 and also arranged close to the power supply module 205.

It should be understood that the foregoing earphone stem 801 is not limited to be in a shape of a cylinder, but may alternatively be in another shape, such as a shape of a strip or a hexagonal prism. The shape of the earphone stem 801 is not specifically limited in this embodiment of this application.

In a case that the pressure-strain structure 803 is arranged in the cavity formed by the earphone stem 801, a strain sensor arranged on the pressure-strain structure 803 may be coupled to the foregoing circuit board 804 through a soft board, that is, an FPC, so that the strain sensor may be coupled to the processor.

Figure 8B:
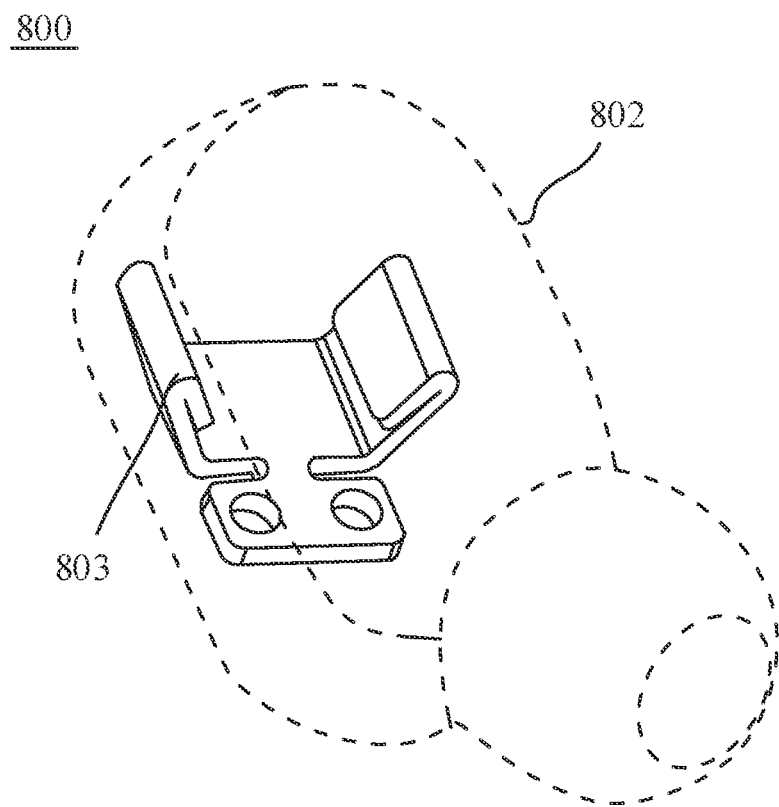
FIG. 8B is a schematic structural diagram of still another earphone body according to an embodiment of this application.

It should be further understood that the earphone 800 provided in this embodiment of this application may not be arranged with the earphone stem 801, for example, like an earphone shown in FIG. 8B (components such as the processor are not shown in the figure). That is, the pressure-strain structure 803 and modules such as the processor of the earphone are all arranged in the earphone head 802 of the earphone, and the function keys of the earphone may be implemented in a manner of pressing the pressure-strain structure in the earphone in multiple directions. For the specific manner, reference may be made to the descriptions of the foregoing embodiments, and details are not described herein again.

To reduce structural displacements due to long-term use, the pressure-strain structure 803 is provided with a positioning hole 8031, and the pressure-strain structure 803 may be fixed to the circuit board 804 through the positioning hole 8031 on the pressure-strain structure 803. For example, the pressure-strain structure 803 may be fixed to the circuit board 804 in a connection and fixing manner such as through welding, hot melt, or a screw.

Figure 9:
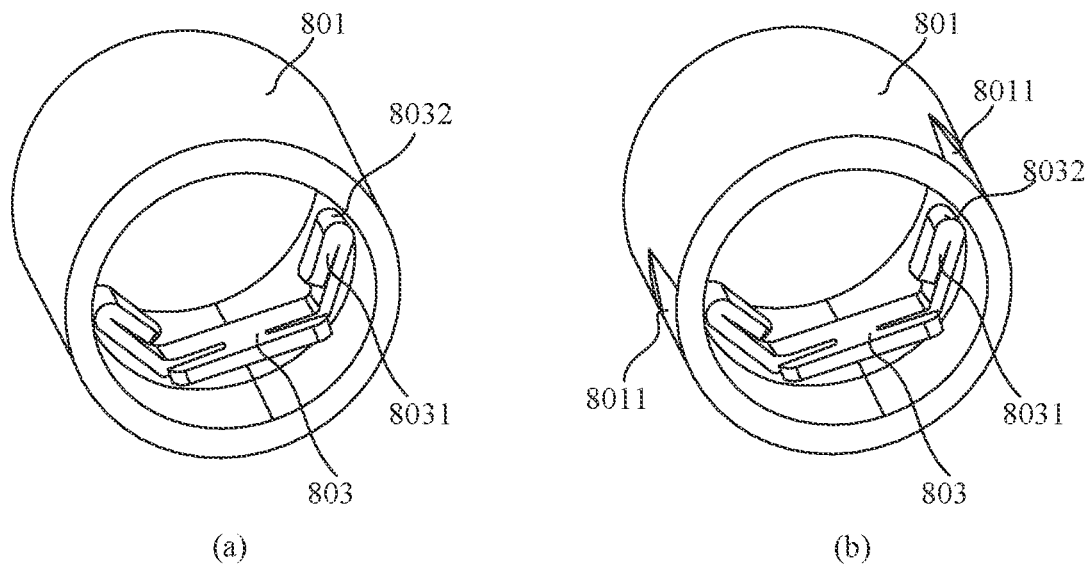
FIG. 9 is a schematic structural diagram of arranging a pressure-strain structure in an earphone stem according to an embodiment of this application.

To enable the user to squeeze the housing of the earphone conveniently, as shown in (a) in FIG. 9, the housing of the earphone stem 801 is a smooth cylindrical rod structure, and an interior of the housing of the earphone stem 801 is also a circular arc surface. In this case, two side plates 8031 of the pressure-strain structure 803 may be arranged toward two sides of the housing of the earphone stem 801, and end portions 8032 of the side plates 8031 are in stable contact with an inner wall of the housing of the earphone stem 801.

To enable the user to quickly and conveniently find positions at which squeezing is performed to use the function keys of the earphone body 900, in contact regions between the housing of the earphone stem 801 and the end portions 8032 of the side plates 8031 of the pressure-strain structure 803, partial plane processing is performed along an external diameter of the earphone stem 801, to form plane positioning regions 8011, as shown in (b) in FIG. 9. In a case that the user intends to squeeze the housing of the earphone stem 801 to use the function keys, the user only needs to find and squeeze the planar positioning regions 8011, which can increase a sense of positioning and improve user experience. Moreover, the addition of the planar positioning regions 8011 can enable the user to accurately find the positions at which squeezing is performed to use the function keys, and therefore, in a case that the user squeezes the pressure-strain structure 803 in two directions, detection precision and detection stability of the strain sensor in the pressure-strain structure 803 can be improved, thereby improving overall performance of the earphone.

It should be noted that, generally, for ease of operations by the user, the regions of the housing of the earphone stem 801 that are in contact with the pressure-strain structure 803 in the earphone body 800 are located on two sides of the earphone body 800 (taking FIG. 8A as an example, the two sides of the earphone body 800 refers to a front side and a rear side of the housing of the earphone stem 801 shown in FIG. 8A).

In addition, for the earphone body provided in this embodiment of this application, the function keys of the earphone are used in a squeezing manner. During use of the function keys by the user, an accidental touch may occur.

To reduce occurrence of the accidental touches, exemplarily, in some embodiments, a capacitance-assisted detection solution may be added to the pressure-strain structure 803 shown in FIG. 8A, to assist in determining squeezing strength and directions based on changes in capacitances in different regions of the pressure-strain structure 803 during squeezing.

The foregoing pressure-strain structure 302 shown in FIG. 7 is used as an example. The pressure-strain structure 803 may be divided into four regions, namely, a region A 1001, a region B 1002, a region C 1003, a region D 1004. The inner side surface 7011 of the bottom plate 701 is the region A 1001, the outer side surface 7012 of the bottom plate 701 is the region B 1002, and back surfaces of the two side plates 702 are respectively the region C 1003 and the region D 1004. Copper sheet networks are respectively arranged in the region A 1001, the region B 1002, the region C 1003, and the region D 1004 of the pressure-strain structure 302. The copper sheet networks are coupled to a capacitive sensing channel through the soft board (for example, the FPC). In addition, the pressure-strain structure 302 is also coupled to the capacitive sensing channel through the soft board (for example, the FPC), to be used as a reference terminal during capacitance detection. The foregoing capacitive sensing channel may be arranged on the circuit board 804 as shown in FIG. 8A, and coupled to the processor on the circuit board 804.

An example in which the pressure-strain structure 302 is arranged inside the cavity formed by the earphone stem 801 is used. The user may squeeze the housing of the earphone in directions indicated by arrows shown in (a) in FIG. 11, that is, the user squeezes the regions of the housing of the earphone stem 801 that are in contact with the pressure-strain structure 302 in directions indicated by arrows shown in (b) in FIG. 11. As fingers approach and touch the housing of the earphone stem 801, capacitances in the regions (that is, the region C 1003 and the region D 1004 shown in FIG. 10) of the side plates 702 of the pressure-strain structure 203 change significantly. Change quantities of capacitances in the regions (that is, the region A 1001 and the region B 1002 shown in FIG. 10) of the bottom plate 701 of the pressure-strain structure 203 are less than change quantities of the capacitances in the regions (that is, the region C 1003 and the region D 1004 shown in FIG. 10) of the side plates 702.

Figure 10:
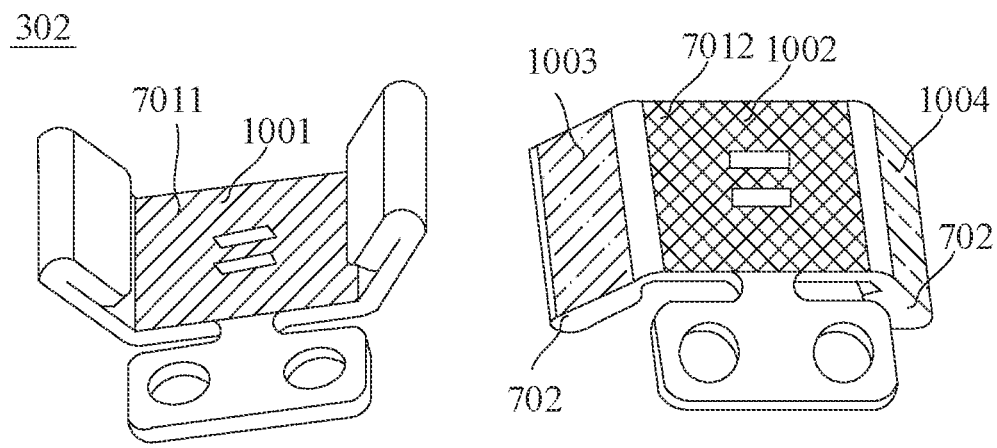
FIG. 10 is a schematic structural diagram of arranging a capacitance sensing region on a pressure-strain structure according to an embodiment of this application.
Figure 11:
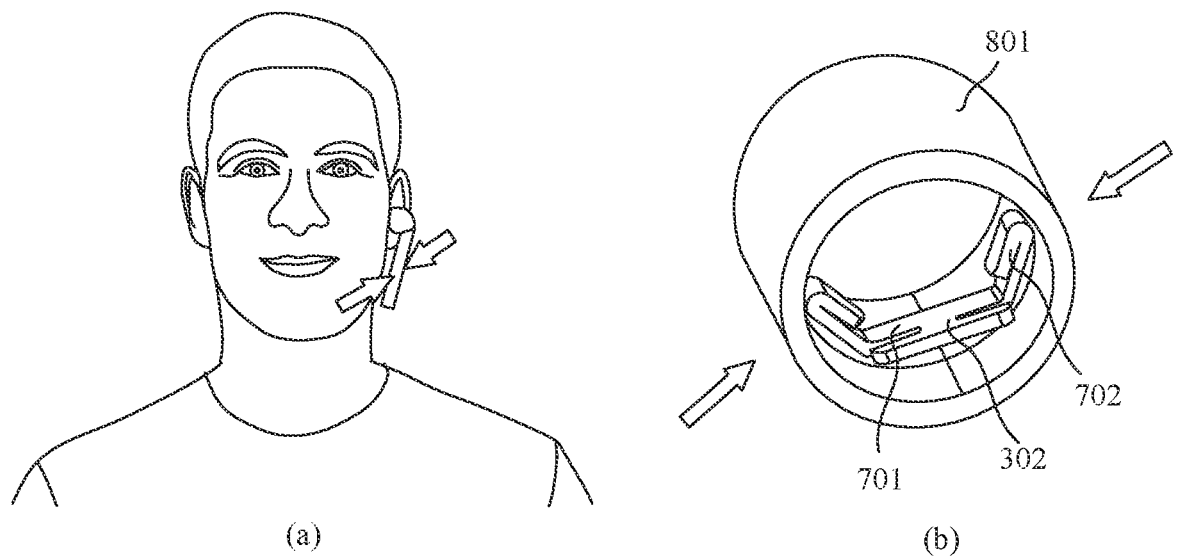
FIG. 11 is a schematic structural diagram of a squeezing scenario according to an embodiment of this application.

It should be understood that, in a case that the user squeezes the housing accidentally, change quantities of the capacitances in the four capacitance regions, that is, the region A 1001, the region B 1002, the region C 1003, and the region D 1004 shown in FIG. 10, are distinctly different from change quantities of the capacitances in the four regions (that is, the region A 1001, the region B 1002, the region C 1003, and the region D 1004) in a case that the user actively squeezes the housing of the earphone stem 801. For example, in a case that the user accidentally squeezes a region of the housing of the earphone stem 801 that is in contact with a side of the pressure-strain structure 302 (for example, a side of the region C 1003 shown in FIG. 10), the capacitance in the region C 1003 changes significantly, that is, the change quantity of the capacitance is relatively large, while the change quantity of the capacitance in the region D 1014 is relatively small, and the change quantities in the region A and the region B are also relatively small. In a case that the user accidentally touches a region of the housing of the earphone stem 801 that fails to be in contact with the pressure-strain structure 302, the change quantities of the capacitances in the region A 1001, the region B 1002, the region C 1003, and the region D 1004 shown in FIG. 10 may all be relatively small.

It can be seen that the processor in the earphone may assist in determining squeezed strength and directions by analyzing the change quantities of the capacitances in the region A 1001, the region B 1002, the region C 1003, and the region D 1004 shown in FIG. 10, and may determine, with reference to magnitude of the strain sensed by the strain sensor 303 in the pressure-strain structure 302, whether the user actively squeezes the housing of the earphone (for example, the housing of the earphone stem 801), to achieve the purpose of pausing or playing, thereby improving the accuracy of strain detection.

It should be noted that the foregoing four capacitance detection regions may be flexibly arranged according to an actual situation. For example, only the region B 1002, the region C 1003, and the region D 1004 may be arranged, or only the region B 1002 and the region C 1003, or the region B 1002 and the region D 1004 may be arranged.

Figure 12:
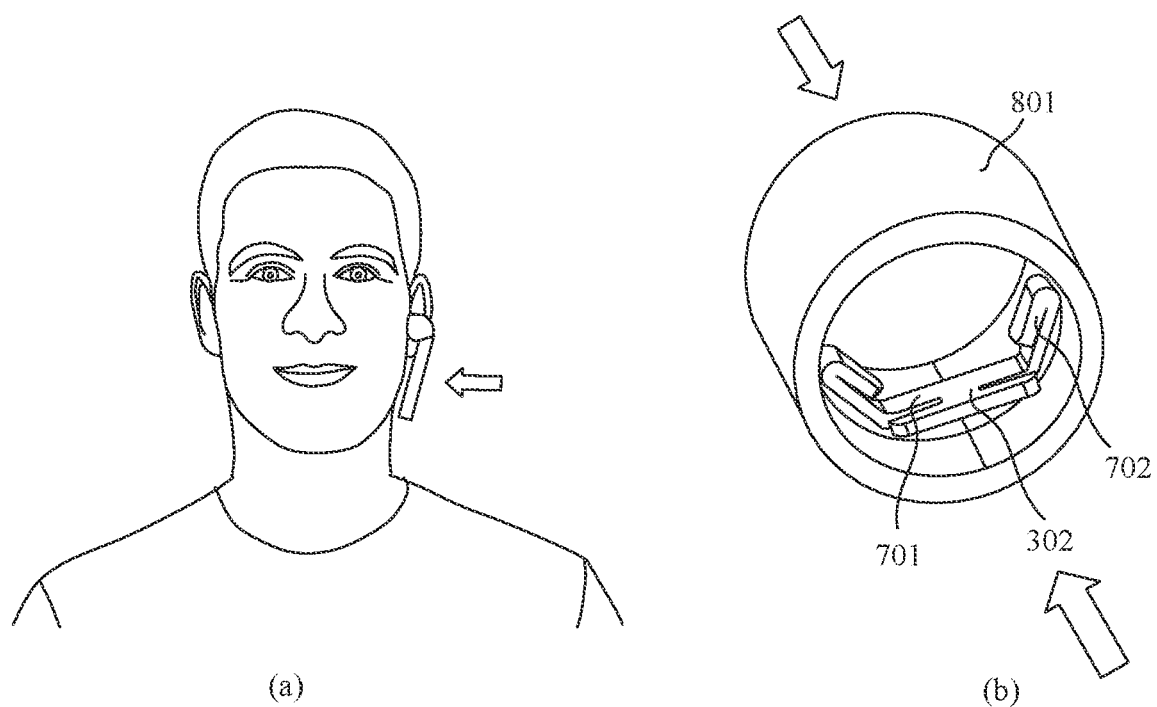
FIG. 12 is a schematic structural diagram of another squeezing scenario according to an embodiment of this application.

In addition, the user may squeeze the housing of the earphone in a direction indicated by an arrow shown in (a) in FIG. 12, that is, the user squeezes the regions of the housing that fail to be in contact with the pressure-strain structure in directions indicated by arrows shown in (b) in FIG. 12. In this case, in a case that the user squeezes the housing of the earphone (that is, the housing of the earphone stem 801) from an outer side to a pinna side, an inner region of the housing of the earphone stem 801 is in contact with human skin (for example, skin of a pinna or a cheek), and an outer region of the housing of the earphone stem 801 is in contact with a finger of the user. In this case, the region A 1001 and the region B 1002 of the pressure-strain structure 302 shown in FIG. 10 are closer to the region being in contact with a human body, and therefore, changes in the capacitances in the region A 1001 and the region B 1002 are more significant, that is, the change quantities of the capacitances are relatively large. The region C 1003 and the region D 1004 are far away from the region being in contact with the human body, and therefore, change quantities of the capacitances in the region C 1003 and the region D 1004 are relatively small. That is, the changes quantities of the capacitances in the four regions (that is, the region A 1001, the region B 1002, the region C 1003, and the region D 1004) in a case that the regions on the housing of the earphone that fail to be in contact with the pressure-strain structure are squeezed are distinctly different from the change quantities of the capacitances in the four regions in a case that the regions on the housing of the earphone that are in contact with the pressure-strain structure 302 are squeezed.

In this way, capacitance detection can assist in determining the squeezing directions (that is, directions in which the strain is generated), and therefore, according to differences in the strain directions and differences in the capacitance changes caused by different squeezing directions, manners of squeezing the housing of the earphone in different directions may be configured as different key functions, thereby expanding the key functions and improving the user experience.

It should be understood that in a case that the housing of the earphone (for example, the housing of the earphone stem 801) is not subject to external forces, the pressure-strain structure 302 remains at an initial position. For example, the region A 1001, the region B 1002, the region C 1003, and the region D 1004 shown in FIG. 10 remain initial capacitance states.

In addition, the foregoing pressure-strain structure 302 may be further configured to perform sliding detection. Exemplarily, in a scenario in which the earphone is put on normally, the user may gently slide along a tube wall of the housing of the earphone stem 801, for example, in a direction indicated by an arrow shown in (a) in FIG. 13. In this case, the housing of the earphone stem 801 is not subject to a significant squeeze force, and therefore, the strain generated by the pressure-strain structure 302 is not significant.

Figure 13:
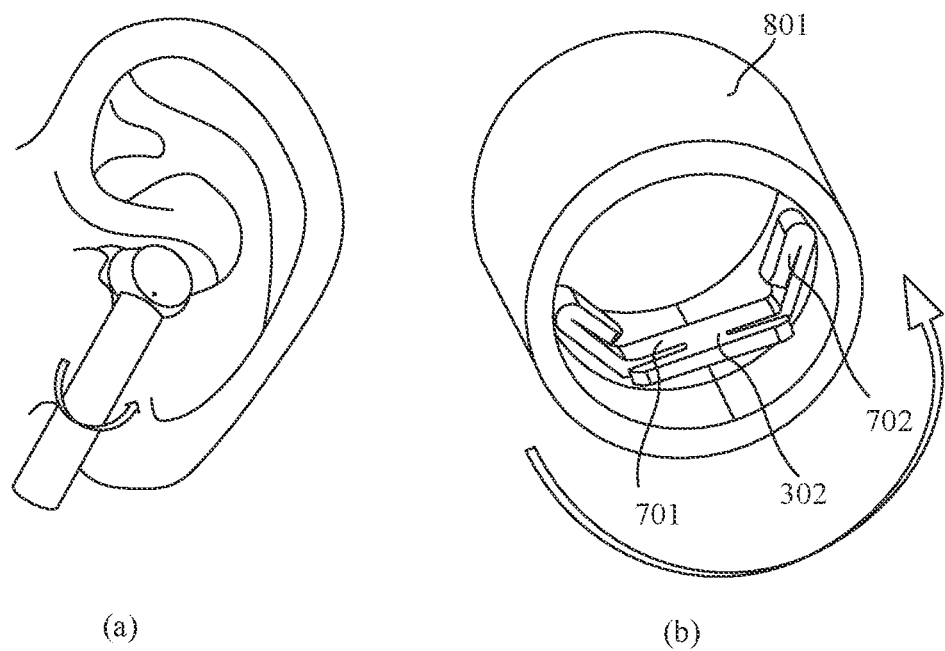
FIG. 13 is a schematic structural diagram of a sliding scenario according to an embodiment of this application.

In this case, a finger of the user may slide along the outer wall of the housing of the earphone stem 801 in a direction indicated by an arrow shown in (b) in FIG. 13. Skin of the finger gradually approaches the region C 1003 on the pressure-strain structure 302 shown in FIG. 10, and then gradually moves away from the region C 1003. In a process of moving away from the region C 1003, the skin of the finger gradually approaches the region B 1002 of the pressure-strain structure 302, and then gradually moves away from the region B 1002. In a process of moving away from the region B 1002, the skin of the finger gradually approaches the region D 1004 of the pressure-strain structure 302, and then gradually moves away from the region D 1004. Therefore, the capacitance in the region B 1002 of the pressure-strain structure gradually increases and then gradually decreases, then the capacitance in the region C 1003 gradually increases and then gradually decreases, and subsequently, the capacitance in the region D 1004 gradually increases and then decreases. That is, during the sliding, the capacitance in the region B 1002 changes first, then the capacitance in the region C 1003 changes, and finally the capacitance in the region D 1004 changes.

In this way, according to change features of the capacitances in the region B 1002, the region C 1003, and the region D 1004 and with reference to the magnitude of the strain sensed by the strain sensor in the pressure-strain structure 302, a function (such as volume adjustment) of the earphone may be set to be implemented in a case that sliding is performed along the surface of housing of the earphone (for example, the housing of the earphone stem 801).

It should be noted that, to achieve the accuracy of detection, certain displacement is required during sliding, that is, a sliding range should be as large as possible.

The following describes interaction between the earphone and an electronic device (for example, a mobile phone) by taking listening to music as an example.

In a case that a communicative connection (for example, a Bluetooth connection) is established between the earphone and the mobile phone, the earphone may be configured to listen to music played by the mobile phone. For example, in a case that the user wants to pause music, the user may squeeze the housing of the earphone in the directions shown in (a) in FIG. 11. The earphone sends a first instruction to the mobile phone in response to a squeezing operation performed by the user on the housing of the earphone. In a case that the mobile phone receives the first instruction sent by the earphone, the mobile phone is controlled to stop playing music. For another example, in a case that the user wants to record sound, the user may squeeze the housing of the earphone in the direction shown in (a) in FIG. 12, and the earphone sends a second instruction to the mobile phone in response to a squeezing operation performed by the user on the housing of the earphone. In a case that the mobile phone receives the second instruction sent by the earphone, the mobile phone is controlled to perform a sound recording operation. For still another example, in a case that the user intends to adjust volume, the user may slide along the housing of the earphone in the direction shown in (a) in FIG. 13, and the earphone sends a third instruction to the mobile phone in response to a sliding operation performed by the user on the housing of the earphone. In a case that the mobile phone receives the third instruction sent by the earphone, the mobile phone is controlled to adjust the volume (for example, turning up the volume or turning down the volume).

Only some scenarios in which the earphone interacts with the mobile phone are described above. Therefore, the foregoing examples constitute no limitation on scenarios in which the earphone interacts with the mobile phone.

It should be understood that the foregoing embodiments are described by using the wireless earphone as examples. That the function keys of the earphone are implemented through the foregoing pressure-strain structure is not limited to be applied to the wireless earphone, but may also be applied to the wired earphone. A type of the earphone is not specifically limited in the embodiments of this application.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work processes of the system, the apparatus and the unit described above, reference may be made to the corresponding processes in the foregoing method embodiments. Details are not described herein again.

In functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of this application essentially, or the part contributing to the related art, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An earphone, comprising:
a housing, wherein a pressure-strain structure is arranged in a cavity formed by the housing;
wherein:
the pressure-strain structure comprises a bottom plate and side plates connected to two side edges of the bottom plate, and an angle is provided between each side plate and the bottom plate;
an end portion of each side plate away from the bottom plate is in stable contact with the inner wall of the housing;
two end portions of the pressure-strain structure are both in stable contact with an inner wall of the housing;
a strain sensor is arranged on the pressure-strain structure; and
in a case that the housing is squeezed, the pressure-strain structure generates strain, and the strain sensor is configured to sense the strain generated by the pressure-strain structure.

2. The earphone according to claim 1, wherein the strain sensor is arranged on a first surface of the pressure-strain structure and/or a second surface of the pressure-strain structure.

3. The earphone according to claim 1, wherein the strain sensor is arranged on a first surface of the bottom plate and/or a second surface of the bottom plate.

4. The earphone according to claim 1, wherein in a case that regions of the housing that are in contact with two ends of the pressure-strain structure are squeezed, the strain sensor is configured to sense first strain generated by the pressure-strain structure.

5. The earphone according to claim 4,
wherein a processor is arranged in the cavity formed by the housing, the strain sensor is electrically connected to the processor through a measurement circuit, and the measurement circuit is configured to output a first signal to the processor according to the first strain; and
wherein the first signal is used to instruct the earphone to perform a first operation, and the first operation comprises one of power-on, power-off, pausing, playing, or sound recording.

6. The earphone according to claim 1, wherein in a case that regions of the housing that fail to be in contact with the pressure-strain structure are squeezed, the strain sensor is configured to sense second strain generated by the pressure-strain structure.

7. The earphone according to claim 6,
wherein a processor is arranged in the cavity formed by the housing, the strain sensor is electrically connected to the processor through a measurement circuit, and the measurement circuit is configured to output a second signal to the processor according to the second strain; and
wherein the second signal is used to instruct the earphone to perform a second operation, and the second operation comprises one of power-on, power-off, pausing, playing, or sound recording.

8. The earphone according to claim 5,
wherein the cavity formed by the housing further comprises a printed circuit board;
wherein the processor is arranged on the printed circuit board; and
wherein the strain sensor is electrically connected to the printed circuit board through a soft board, so that the strain sensor is electrically connected to the processor.

9. The earphone according to claim 1,
wherein the housing comprises a housing of an earphone head and a housing of an earphone stem; and
wherein the pressure-strain structure is arranged in a cavity formed by the housing of the earphone stem, and the two end portions of the pressure-strain structure are in stable contact with an inner wall of the housing of the earphone stem.

10. The earphone according to claim 9, wherein a planar positioning region is arranged at a position on an outer surface of the housing of the earphone stem close to a region of the housing of the earphone stem that is in contact with the pressure-strain structure.

11. The earphone according to claim 1,
wherein the housing comprises a housing of an earphone head; and
wherein the pressure-strain structure is arranged in a cavity formed by the housing of the earphone head, and the two end portions of the pressure-strain structure are in stable contact with an inner wall of the housing of the earphone head.

12. The earphone according to claim 1,
wherein the first surface of the pressure-strain structure comprises a first region and a second region, and the first region and the second region are respectively close to the regions of the housing that are in contact with the two ends of the pressure-strain structure;
wherein a first capacitance detection contact piece is attached to the first region and/or a second capacitance detection contact piece is attached to the second region; and
wherein in a case that the housing is squeezed, the first capacitance detection contact piece is configured to detect a capacitance generated in the first region and/or the second capacitance detection contact piece is configured to detect a capacitance generated in the second region.

13. The earphone according to claim 12,
wherein the first surface of the pressure-strain structure further comprises a third region, the third region is located between the first region and the second region, and a third capacitance detection contact piece is attached to the third region; and
wherein in a case that the housing is squeezed, the third capacitance detection contact piece is configured to detect a capacitance generated in the third region.

14. The earphone according to claim 13,
wherein a fourth region is located at a position on the second surface of the pressure-strain structure opposite to the third region, and a fourth capacitance detection contact piece is attached to the fourth region; and
wherein in a case that the housing is squeezed, the fourth capacitance detection contact piece is configured to detect a capacitance generated in the fourth region.

15. The earphone according to claim 13,
wherein in a case that sliding is performed along an outer wall of the housing, the first capacitance detection contact piece is further configured to detect the capacitance generated in the first region, the second capacitance detection contact piece is further configured to detect the capacitance generated in the second region, and the third capacitance detection contact piece is further configured to detect the capacitance generated in the third region.

* * * * *